(12) United States Patent
Li

(10) Patent No.: US 11,578,847 B2
(45) Date of Patent: Feb. 14, 2023

(54) LIGHTHOUSE

(71) Applicant: ATLAS COPCO (WUXI) COMPRESSOR CO., LTD, Wuxi (CN)

(72) Inventor: Qiang Li, Wuxi (CN)

(73) Assignee: ATLAS COPCO (WUXI) COMPRESSOR CO., LTD., Wuxi (CN)

( * ) Notice: Subject to any disclaimer, the term of this patent is extended or adjusted under 35 U.S.C. 154(b) by 0 days.

(21) Appl. No.: 17/557,662

(22) Filed: Dec. 21, 2021

(65) Prior Publication Data
US 2022/0205601 A1 Jun. 30, 2022

(30) Foreign Application Priority Data
Dec. 28, 2020 (CN) .......................... 202011582012.1

(51) Int. Cl.
| | |
|---|---|
| *F21S 8/08* | (2006.01) |
| *F21S 9/03* | (2006.01) |
| *F21S 9/04* | (2006.01) |
| *F21V 15/01* | (2006.01) |
| *F21V 17/10* | (2006.01) |
| *F21V 23/00* | (2015.01) |

(52) U.S. Cl.
CPC .............. *F21S 8/085* (2013.01); *F21S 9/035* (2013.01); *F21S 9/04* (2013.01); *F21V 15/01* (2013.01); *F21V 17/10* (2013.01); *F21V 23/007* (2013.01)

(58) Field of Classification Search
CPC .. F21L 14/04; F21S 8/085; F21S 9/035; F21S 9/04; F21V 15/01; F21V 17/10; F21V 21/36; F21V 23/003; F21V 23/007; Y02E 10/50
See application file for complete search history.

(56) References Cited

U.S. PATENT DOCUMENTS

| | | | | |
|---|---|---|---|---|
| 8,295,033 B2* | 10/2012 | Van Straten | ............ | H02S 20/30 290/55 |
| 8,439,534 B1* | 5/2013 | Roe | ........................ | F21V 29/763 362/418 |
| 2012/0201015 A1* | 8/2012 | Robertson | ............... | F21L 14/04 362/183 |
| 2012/0201016 A1* | 8/2012 | Robertson | .............. | B62D 63/08 362/183 |
| 2013/0039049 A1* | 2/2013 | Jones | ...................... | F21V 21/22 362/184 |

(Continued)

FOREIGN PATENT DOCUMENTS

| | | | | | |
|---|---|---|---|---|---|
| AU | 2013100095 | * | 3/2013 | .............. | F21V 21/14 |
| AU | 2014200401 A1 | | 8/2015 | | |

(Continued)

*Primary Examiner* — Zheng Song
(74) *Attorney, Agent, or Firm* — Bacon & Thomas, PLLC

(57) ABSTRACT

A lighthouse includes a mast device and a lighting device mounted on the mast device. The lighthouse further includes a main body including a box body and a top cover, the top cover is arranged on a top of the box body, the top cover and the box body define a receiving chamber, and the top cover is movable or detachable relative to the box body to open or close the receiving chamber. The lighthouse is convenient for overhaul and maintenance, and improves the maintenance efficiency.

17 Claims, 8 Drawing Sheets

(56) References Cited

U.S. PATENT DOCUMENTS

| | | | |
|---|---|---|---|
| 2013/0250561 A1* | 9/2013 | Knodel | F21S 9/03 |
| | | | 362/184 |
| 2013/0301253 A1* | 11/2013 | Drever | F21L 4/02 |
| | | | 362/184 |
| 2015/0215587 A1* | 7/2015 | Carpoff | F21S 9/043 |
| | | | 362/183 |
| 2016/0186945 A1* | 6/2016 | Knodel | F21S 9/04 |
| | | | 362/485 |
| 2018/0273121 A1* | 9/2018 | Kennedy | B60Q 1/02 |
| 2018/0287549 A1* | 10/2018 | Long | F21S 9/035 |

FOREIGN PATENT DOCUMENTS

| | | | | |
|---|---|---|---|---|
| CN | 207394449 U | | 5/2018 | |
| CN | 207438225 U | | 6/2018 | |
| CN | 211060072 U | | 7/2020 | |
| WO | WO 2017/031586 | * | 3/2017 | ............. F21L 13/00 |

* cited by examiner

LIGHTHOUSE

FIELD OF THE INVENTION

The present disclosure relates to the technical field of lighthouses, in particular to a lighthouse.

BACKGROUND OF THE INVENTION

Lighthouses in the related art can be used for lighting, including fixed lighthouses and mobile lighthouses. However, due to the structural limitations of lighthouses in the related art, maintenance of lighthouses is not convenient, and there are hidden troubles of dust falling from the top and water ingress.

SUMMARY OF THE INVENTION

The present disclosure aims to solve at least one of the technical problems in the related art. For this reason, the present disclosure provides a lighthouse which is convenient for overhaul and maintenance.

A lighthouse is provided according to the embodiment of the present disclosure, and the lighthouse includes a mast device and a lighting device mounted on the mast device, the lighthouse further includes: a main body including a box body and a top cover, the top cover is arranged on a top of the box body, the top cover and the box body define a receiving chamber, and the top cover is movable or detachable relative to the box body to open or close the receiving chamber.

The lighthouse according to the present disclosure facilitates the overhaul and maintenance of parts, assemblies, devices, etc. in the receiving chamber, improves maintenance efficiency, and can prevent dust and water from entering the box body from the top to protect the lighthouse.

In some embodiments, the lighthouse further includes: a built-in assembly arranged in the receiving chamber and electrically connected to the lighting device; and a power supply assembly arranged in the receiving chamber and electrically connected to the built-in assembly to provide electrical energy to the lighting device.

In some embodiments, the receiving chamber includes an upper receiving chamber and a lower receiving chamber, the upper receiving chamber is located above the lower receiving chamber, the built-in assembly is received in the upper receiving chamber, the upper receiving chamber is opened to expose the built-in assembly when the top cover opens the receiving chamber, and the power supply assembly is received in the lower receiving chamber.

In some embodiments, the receiving chamber includes an upper receiving chamber and a lower receiving chamber, the upper receiving chamber is located above the lower receiving chamber, the power supply assembly is received in the upper receiving chamber, the upper receiving chamber is opened to expose the power supply assembly when the top cover opens the receiving chamber, and the built-in assembly is received in the lower receiving chamber.

In some embodiments, the box body is further provided with a side openable door, and the side openable door corresponds to the built-in assembly and is provided on a side surface of the box body.

In some embodiments, the top cover is pivotally connected to the box body so as to be rotatable between an open position in which the receiving chamber is opened and a closed position in which the receiving chamber is closed.

In some embodiments, the lighting device is located on a side of the box body in a first direction, and a top edge of the box body on a side close to or away from the lighting device in the first direction is pivotally connected to the top cover.

In some embodiments, the top cover has a handle provided thereon.

In some embodiments, the top cover is slidably connected to the box body so as to be slidable between an open position in which the receiving chamber is opened and a closed position in which the receiving chamber is closed.

In some embodiments, the top cover includes two sub-covers, each of the two sub-covers is slidably connected to the box body, the two sub-covers move towards each other to close the receiving chamber, and the two sub-covers move away from each other to open the receiving chamber.

In some embodiments, the built-in assembly includes an electric control device, the top cover includes a window or a first openable door arranged oppositely to a local part of the electric control device, and/or, the box body has a lifting ring provided therein, and the top cover includes a second openable door arranged oppositely to the lifting ring.

In some embodiments, the power supply assembly includes a solar module.

In some embodiments, the box body has a drawing port provided in a side wall thereof, the drawing port being in communication with the receiving chamber, and the solar module is movable between a position in which the solar module is received in the receiving chamber and a position in which the solar module is drawn out of the receiving chamber through the drawing port.

In some embodiments, the solar module includes at least one solar unit, each solar unit includes at least one stage unfolding mechanism, and each stage unfolding mechanism includes a solar panel.

In some embodiments, each stage unfolding mechanism further includes a sliding frame and a pusher, the solar panel is connected to the sliding frame to slide following the sliding frame to be unfolded, the solar panel is pivotally connected to the sliding frame, and two ends of the pusher are pivotally connected to the sliding frame and the solar panel, respectively, to push the solar panel to rotate relative to the sliding frame.

In some embodiments, the box body has the drawing port provided on two sides thereof, the solar module includes two solar units, the two solar units are drawable out in opposite directions through the drawing ports on the two sides, respectively, and when the two solar units are both received in the receiving chamber, the two solar units are stacked up.

In some embodiments, the built-in assembly includes a charging and discharging device and a battery, the solar module is electrically connected to the charging and discharging device, the charging and discharging device is electrically connected to the battery, and the battery is electrically connected to the lighting device.

In some embodiments, the power supply assembly further includes: an oil tank, an engine, and an electricity generator, the oil tank is connected to the engine to supply oil to the engine, the engine is connected to the electricity generator to drive the electricity generator to generate electricity, the electricity generator is electrically connected to the charging and discharging device, and the solar module is located above the oil tank, the engine, and the electricity generator.

In some embodiments, the power supply assembly includes: an oil tank, an engine, and an electricity generator, the oil tank is connected to the engine to supply oil to the engine, the engine is connected to the electricity generator to drive the electricity generator to generate electricity, the built-in assembly includes a charging and discharging device and a battery, the electricity generator is electrically connected to the charging and discharging device, the charging and discharging device is electrically connected to the battery, and the battery is electrically connected to the lighting device.

The additional aspects and advantages of the present disclosure will be partly given in the following description, and part of them will become apparent from the following description, or be understood through the practice of the present disclosure.

Figure 1:
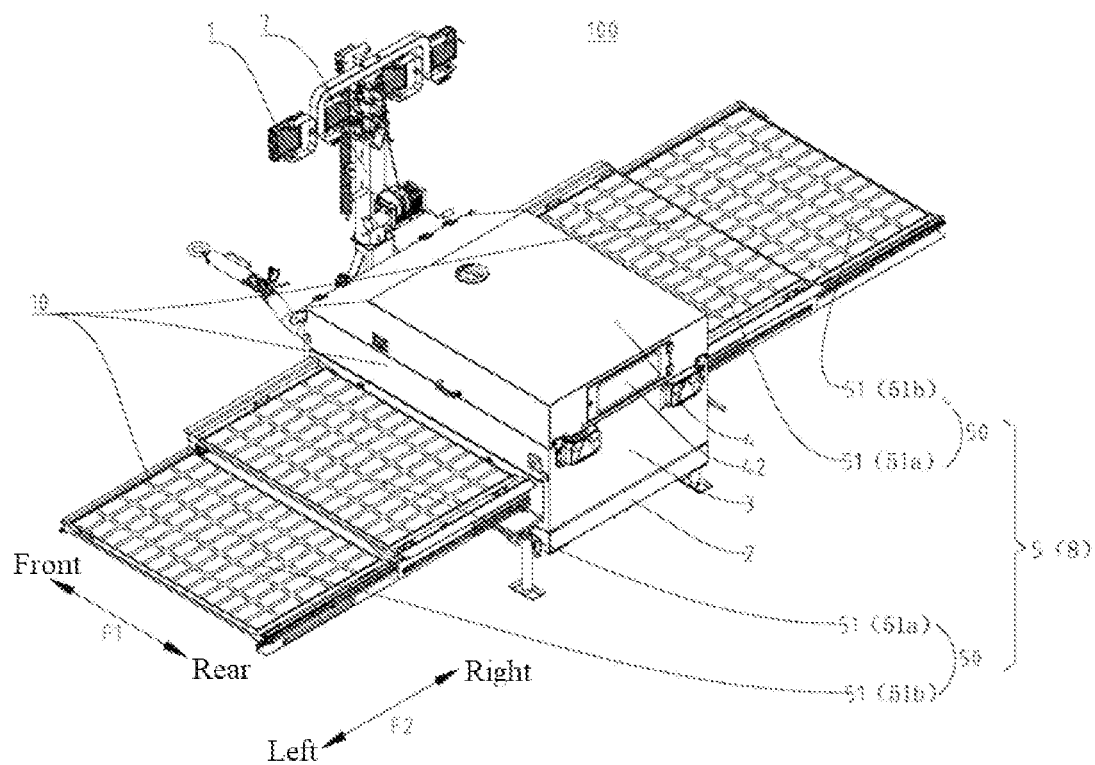
FIG. 1 is a schematic diagram of a lighthouse in a state according to an embodiment of the present disclosure.

Reference signs:

lighthouse 100;

solar device 10; lighting device 1; carrier 2; wheel 21;

box body 3; cover plate 31; cover plate hinge 32; lifting ring 33;

top cover 4; receiving chamber 40; second openable door 41; window 42; first handle 43; second handle 44;

top cover hinge 45; top surface 4a; side surface 4b; rear surface 4c;

solar module 5; solar unit 50;

unfolding mechanism 51; first stage unfolding mechanism 51a; second stage unfolding mechanism 51b;

solar panel 511; sliding frame 512; pusher 513; frame hinge 514;

built-in assembly 6; battery 61; charging and discharging device 62; electric control device 63; mast device 7;

power supply assembly 8; oil tank 81; engine 82; electricity generator 83.

DETAILED DESCRIPTION OF THE INVENTION

The embodiments of the present disclosure are described in detail below. Examples of the embodiments are shown in the accompanying drawings, throughout which the same or similar reference numerals indicate the same or similar elements or elements with the same or similar functions. The embodiments described below with reference to the accompanying drawings are exemplary, and are intended to explain the present disclosure, but should not be construed as limiting the present disclosure.

The following disclosure provides many different embodiments or examples to implement different structures of the present disclosure. In order to simplify the disclosure of the present disclosure, the components and settings of specific examples are described below. Of course, they are only examples, which do not aim to limit the present disclosure. In addition, the present disclosure may repeat reference numerals and/or letters in different examples. This repetition is for the purpose of simplification and clarity, and does not in itself indicate the relationship between the various embodiments and/or settings discussed. In addition, the present disclosure provides examples of various specific processes and materials, but those of ordinary skill in the art may be aware of the applicability of other processes and/or the use of other materials.

Hereinafter, a lighthouse 100 according to the embodiment of the present disclosure will be described.

As shown in FIG. 1, a lighthouse 100 according to the embodiment of the present disclosure is described. The lighthouse 100 includes a mast device 7 and a lighting device 1 mounted on the mast device 7, so that a height of the lighting device 1 can be adjusted by the mast device 7 to satisfy lighting requirements of different heights. In conjunction with FIGS. 2 and 3, the lighthouse 100 further includes: a main body including a box body 3 and a top cover 4, the top cover 4 is arranged on a top of the box body 3, and the top cover 4 and the box body 3 define a receiving chamber. It should be noted that the receiving chamber can be completely formed in the box body 3; or a part of the receiving chamber can be formed in the box body 3, and the remaining part of the receiving chamber can be formed in the top cover 4.

The top cover 4 is movable or detachable relative to the box body 3 to open or close the receiving chamber. That is, when the top cover 4 is movable relative to the box body 3, the top cover 4 is movable relative to the box body 3 between an open position in which the receiving chamber is opened and a closed position in which the receiving chamber is closed. When the top cover 4 is detachable relative to the box body 3, the top cover 4 can be mounted on the box body 3 to close the receiving chamber, and when the top cover 4 is removed from the box body 3, the receiving chamber can be opened.

It should be noted that the structure of the box body 3 is not limited. In some examples, a part of the box body 3 other than the top of the box body 3 may be in a closed form (i.e., other surfaces of the box body 3 may be closed box panels. Here, it is worth noting that the closed box panels can be provided with the drawing port described later, etc.). In some other examples, the part of the box body 3 other than the top can also be in the form of a hollowed-out frame, etc. (i.e., the box body 3 can be a frame-type box. In this case, the other surfaces of the box body 3 are not in the form of closed box panels. It is worth noting that the hollow position on the frame of the box body 3 can be regarded as the drawing port described later). Here, other examples will not be repeated.

Thus, the lighthouse 100 of the present disclosure facilitates the overhaul and maintenance of parts, assemblies, devices, etc. in the receiving chamber by opening the top cover 4, improves the maintenance efficiency, and can prevent dust water, and others from entering the box body 3 from the top by closing the top cover 4 to protect the lighthouse 100.

In some embodiments, the lighthouse 100 may further include: a power supply assembly 8 and a built-in assembly 6, the built-in assembly 6 is arranged in the receiving chamber, the power supply assembly 8 is arranged in the receiving chamber, the built-in assembly 6 is electrically connected to the lighting device 1, and the power supply assembly 8 is electrically connected to the built-in assembly 6 to provide electrical energy to the lighting device 1. That is, by providing the built-in assembly 6, the power supply assembly 8 can reliably provide electrical energy to the lighting device 1 so that the lighting device 1 can achieve the function of lighting. Therefore, the power supply assembly 8 and the built-in assembly 6 can be protected by the top cover 4 and the box body 3.

Of course, the present disclosure is not limited to this. In other embodiments of the present disclosure, only one of the power supply assembly 8 and the built-in assembly 6 is provided in the receiving chamber, or both are provided outside the receiving chamber. In addition, in other embodiments of the present disclosure, the lighthouse 100 may not include the power supply assembly 8 and the built-in assembly 6. In this case, the lighthouse 100 can work with an external power source, or the lighthouse 100 may include only one of the power supply assembly 8 and the built-in assembly 6.

In some embodiments, the receiving chamber includes an upper receiving chamber and a lower receiving chamber, the upper receiving chamber is located above the lower receiving chamber, the built-in assembly 6 is received in the upper receiving chamber, the upper receiving chamber is opened to expose the built-in assembly 6 when the top cover 4 opens the receiving chamber, and the power supply assembly 8 is received in the lower receiving chamber. Therefore, the built-in assembly 6 can be overhauled after the top cover 4 is opened. In addition, in order to facilitate the overhaul of the power supply assembly 8, the box body 3 may further have a side openable door provided thereon, and the side openable door corresponds to the power supply assembly 8 and is provided on a side surface of the box body 3.

In some embodiments, the receiving chamber includes an upper receiving chamber and a lower receiving chamber, the upper receiving chamber is located above the lower receiving chamber, the power supply assembly 8 is received in the upper receiving chamber, the upper receiving chamber is opened to expose the power supply assembly 8 when the top cover 4 opens the receiving chamber, and the built-in assembly 6 is received in the lower receiving chamber. Therefore, the power supply assembly 8 can be overhauled after the top cover 4 is opened. In addition, in order to facilitate the overhaul of the built-in assembly 6, the box body 3 may be further provided with a side openable door, and the side openable door corresponds to the built-in assembly 6 and is provided on a side surface of the box body 3.

It should be noted that the structural shape of the box body 3 is not limited. For example, when the box body 3 is a square box body, a side wall of the box body 3 may be at least one of a front side wall, a rear side wall, a left side wall, or a right side wall. In addition, it should be noted that the upper receiving chamber and the lower receiving chamber may be or may not be connected, depending on the internal configuration of the box body 3. For example, the upper receiving chamber and the lower receiving chamber may be separated by a partition plate. It is also possible to arrange several beam ribs in the box body 3, and regard a region above the beam ribs as the upper receiving chamber, and a region below the beam ribs as the lower receiving chamber, and so on.

Figure 8:
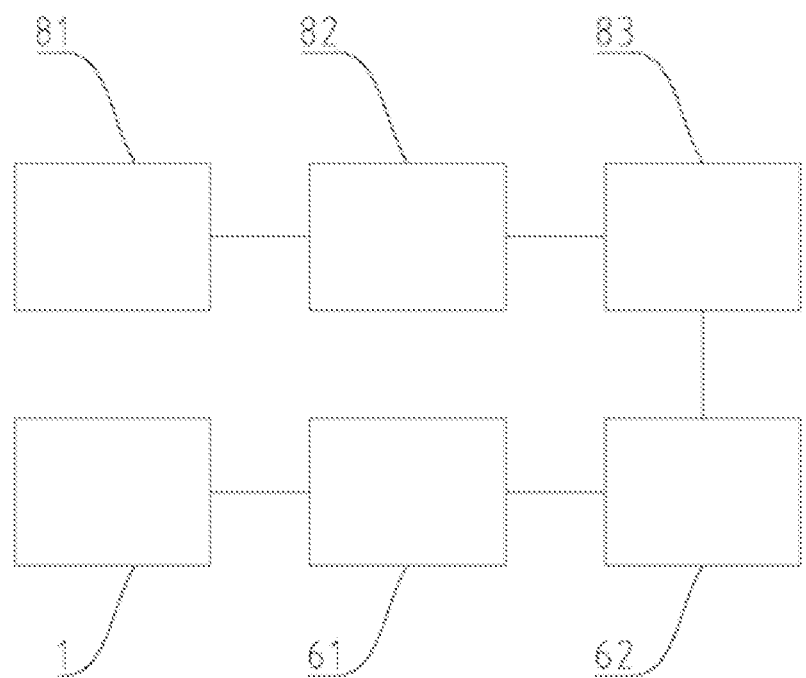
FIG. 8 is a schematic diagram of a lighthouse system according to an embodiment of the present disclosure.

In some embodiments, in conjunction with FIG. 8, the power supply assembly 8 may include an oil tank 81, an engine 82, and an electricity generator 83. The oil tank 81 is connected to the engine 82 to supply oil to the engine 82, and the engine 82 is connected to the electricity generator 83 to drive the electricity generator 83 to generate electricity. The built-in assembly 6 includes a charging and discharging device 62 and a battery 61. The electricity generator 83 is electrically connected to the charging and discharging device 62, the charging and discharging device 62 is electrically connected to the battery 61, and the battery 61 is electrically connected to the lighting device 1. As a result, the lighting function of the lighting device 1 can be realized in a simple and effective way.

In other embodiments, the power supply component 8 is a solar module 5, and the built-in assembly 6 includes a charging and discharging device 62 and a battery 61. The solar module 5 is electrically connected to the charging and discharging device 62, the charging and discharging device 62 is electrically connected to the battery 61, and the battery 61 is electrically connected to the lighting device 1. As a result, the lighting function of the lighting device 1 can be realized in a simple and effective way.

In other embodiments, the power supply assembly 8 includes a solar module 5, an oil tank 81, an engine 82, and an electricity generator 83. The oil tank 81 is connected to the engine 82 to supply oil to the engine 82, and the engine 82 is connected to the electricity generator 83 to drive the electricity generator 83 to generate electricity. The built-in assembly 6 includes a charging and discharging device 62 and a battery 61. The solar module 5 and the electricity generator 83 are electrically connected to the charging and discharging device 62, the charging and discharging device 62 is electrically connected to the battery 61, and the battery 61 is electrically connected to the lighting device 1. Therefore, hybrid charging is realized, and the lighting function of the lighting device 1 can be realized in a simple and effective way.

It should be noted that the specific type of the charging and discharging device 62 described in the above multiple embodiments is not limited, and can be selected according to actual conditions. For example, it may be a converter and/or rectifier, an integrated inverter, etc. In addition, it should be noted that the number of batteries 61 is not limited, for example, it can be two or four, etc., which is not limited here.

Specifically, when the power supply assembly 8 includes the solar module 5, in some embodiments, the solar module 5 can always be arranged outside the box body 3. In this case, it is not necessary to provide in the box body 3 a chamber for receiving the solar module 5. In order to facilitate receiving or transportation, the solar module 5 can be configured in a foldable form, such as fan-shaped folding. However, it is worth noting that the solar module 5, either in a folded state or an unfolded state, is located outside the box body 3, for example, the solar module 5 can be located on an outer side surface of the box body 3.

Figure 2:
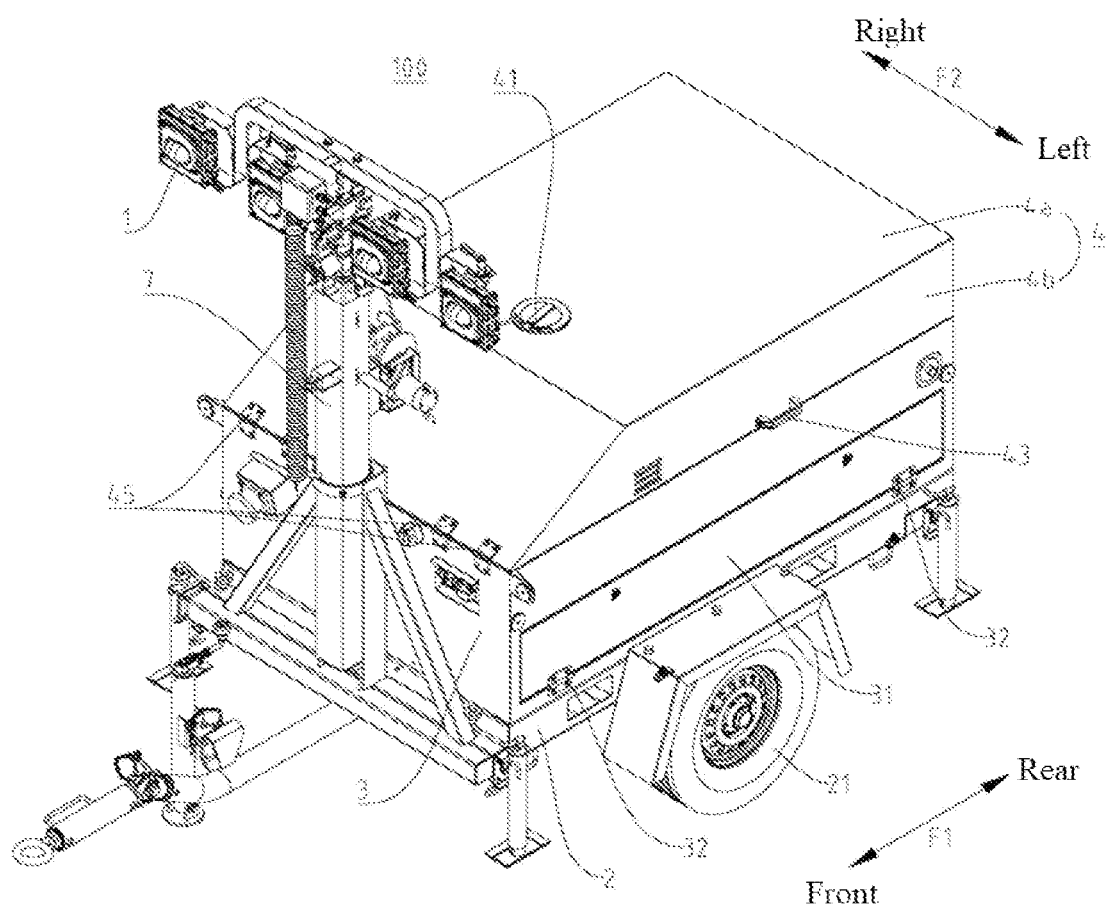
FIG. 2 is a schematic diagram of a lighthouse in a state according to an embodiment of the present disclosure.

In other embodiments, the box body 3 has a drawing port provided in a side wall thereof, the drawing port being in communication with the receiving chamber (i.e., drawing chamber) (the part closed and shielded by the cover plate 31 in FIG. 2 is the drawing port, and as mentioned above, the drawing port can be an opening formed on the closed box panel, or a hollow region on the frame of the box body), and the solar module 5 is movable between a position in which the solar module 5 is received in the receiving chamber and a position in which the solar module 5 is drawn out of the receiving chamber through the drawing port.

Therefore, when the solar module 5 needs to be used to collect solar energy, the solar module 5 can be drawn out from the drawing port (for example, as shown in FIG. 1) to meet the solar energy collection requirements. When the solar module 5 is not needed to collect solar energy, the solar module 5 can be received back into the drawing chamber through the drawing port (for example, as shown in FIG. 2), thereby ensuring that the overall structure of the solar device 10 and the lighthouse 100 is compact, saving space occupancy rate, and facilitating receiving and transportation. When not in use, it can be pushed back and received in the drawing chamber to be protected by the top cover 4 and the box body 3, thereby increasing the service life of the solar module 5, and ensuring that the overall structure of the solar device 10 and the lighthouse 100 is compact, saving space occupancy rate, and facilitating receiving and transportation.

In some embodiments, as shown in FIG. 1 and FIG. 2, the solar module 5 is electrically connected with the lighting device 1. The solar module 5 is movable between a position in which the solar module 5 is received in the drawing chamber and a position in which the solar module 5 is drawn out through the drawing port. The solar module 5 includes at least one solar unit 50, each solar unit 50 includes at least one stage unfolding mechanism 51, and each stage unfolding mechanism 51 includes a solar panel 511. Therefore, when it is necessary to collect solar energy by using the solar module 5, the solar module 5 can be drawn out through the drawing port (e.g. as shown in FIG. 1) to meet the solar energy collection requirements. When it is not necessary to collect solar energy by using the solar module 5, the solar module 5 can be received back to the drawing chamber through the drawing port (e.g. as shown in FIG. 2), Thus, the overall structure of the solar device 10 and the lighthouse 100 is small, the space occupation rate is saved, and the receiving and transportation are convenient.

In some embodiments, as shown in FIG. 1, the solar module 5 includes at least one solar unit 50, and each solar unit 50 includes multiple stage unfolding mechanisms 51, that is, at least two stage unfolding mechanisms 51. For example, when the solar unit 50 includes two stage unfolding mechanisms 51, the two stage unfolding mechanisms 51 are respectively a first stage unfolding mechanism 51a and a second stage unfolding mechanism 51b (as shown in FIG. 1). When the solar unit 50 includes three stage unfolding mechanisms 51, the three stage unfolding mechanisms 51 are respectively a first stage unfolding mechanism 51a, a second stage unfolding mechanism 51b, and a third stage unfolding mechanism (the diagram shows this example), and so on.

In some specific examples, as shown in FIG. 1, the multiple stage unfolding mechanisms 51 can be unfolded stage by stage, the multiple stage unfolding mechanisms 51 can be successively drawn and unfolded in a direction away from the box body 3, and each stage unfolding mechanism 51 includes a solar panel 511, that is, a next stage unfolding mechanism 51 (for example, the second stage unfolding mechanism 51b) can be unfolded to a side away from the box body 3 of a previous stage unfolding mechanism 51 (for example, the first stage unfolding mechanism 51a). Therefore, the solar unit 50 including the multiple stage unfolding mechanisms 51 is a multistage stacked structure, so that an extension distance of the solar unit 50 after being unfolded can be greater, more solar panels 511 can be arranged to absorb more solar energy, and more electric energy can be converted by the solar device 10.

Of course, the present disclosure is not limited to this. In some other specific examples, the multiple stage unfolding mechanisms 51 may alternatively be unfolded along a non-linear trajectory. For example, the first stage unfolding mechanism 51a can move to be unfolded relative to the box body 3 along the F2 direction shown in FIG. 1, the second stage unfolding mechanism 51b can move to be unfolded relative to the first stage unfolding mechanism 51a along the F1 direction shown in FIG. 1. If a third stage unfolding mechanism is included, the third stage unfolding mechanism can move to be unfolded relative to the second stage unfolding mechanism 51b along the F1 direction shown in FIG. 1, and so on. As a result, it is possible to reduce the occupied space in a single direction (for example, the F2 direction shown in FIG. 1) after the multiple stage unfolding mechanisms 51 are unfolded.

Of course, the present disclosure is not limited to this. In some embodiments, the multiple stage unfolding mechanisms 51 can alternatively be unfolded simultaneously, that is, the next stage unfolding mechanism 51 can move simultaneously with the previous stage unfolding mechanism 51. For example, the multiple stage unfolding mechanisms 51 may be connected in a shape of a folding fan. More specifically, every two adjacent stage unfolding mechanisms 51 are pivotally connected. Two adjacent stage unfolding mechanisms present a V shape during the unfolding process, three adjacent stage unfolding mechanisms 51 present an N shape during the unfolding process, and four adjacent stage unfolding mechanisms 51 present an M shape during the unfolding process, and so on.

When the multiple stage unfolding mechanisms 51 are simultaneously unfolded, the multiple stage unfolding mechanisms 51 can be unfolded in a direction away from the box body 3, thereby simplifying the connection between two adjacent stage unfolding mechanisms 51. Of course, the present disclosure is not limited to this. In other embodiments of the present disclosure, it may alternatively be implemented that at least two adjacent stage unfolding mechanisms 51 are unfolded in a direction away from the box body 3, at least two adjacent stage unfolding mechanisms 51 are unfolded in a direction parallel to the box body 3, and so on, description of which will not be repeated here.

Therefore, through the above discussion, whether the multiple stage unfolding mechanisms 51 are unfolded stage by stage or simultaneously, in some specific examples, the multiple stage unfolding mechanisms 51 can be unfolded in a direction away from the box body 3. In this way, on the one hand, it can ensure that the area after unfolding is larger, and on the other hand, it can ensure that the unfolding only takes up one-way space.

In some embodiments, each stage unfolding mechanism 51 further includes a sliding frame 512 and a pusher 513, the solar panel 511 is connected to the sliding frame 512 to slide following the sliding frame 512 to be unfolded, and the solar panel 511 is pivotally connected to the sliding frame 512, and two ends of the pusher 513 are pivotally connected to the sliding frame 512 and the solar panel 511 respectively to push the solar panel 511 to rotate relative to the sliding frame 512.

Figure 4:
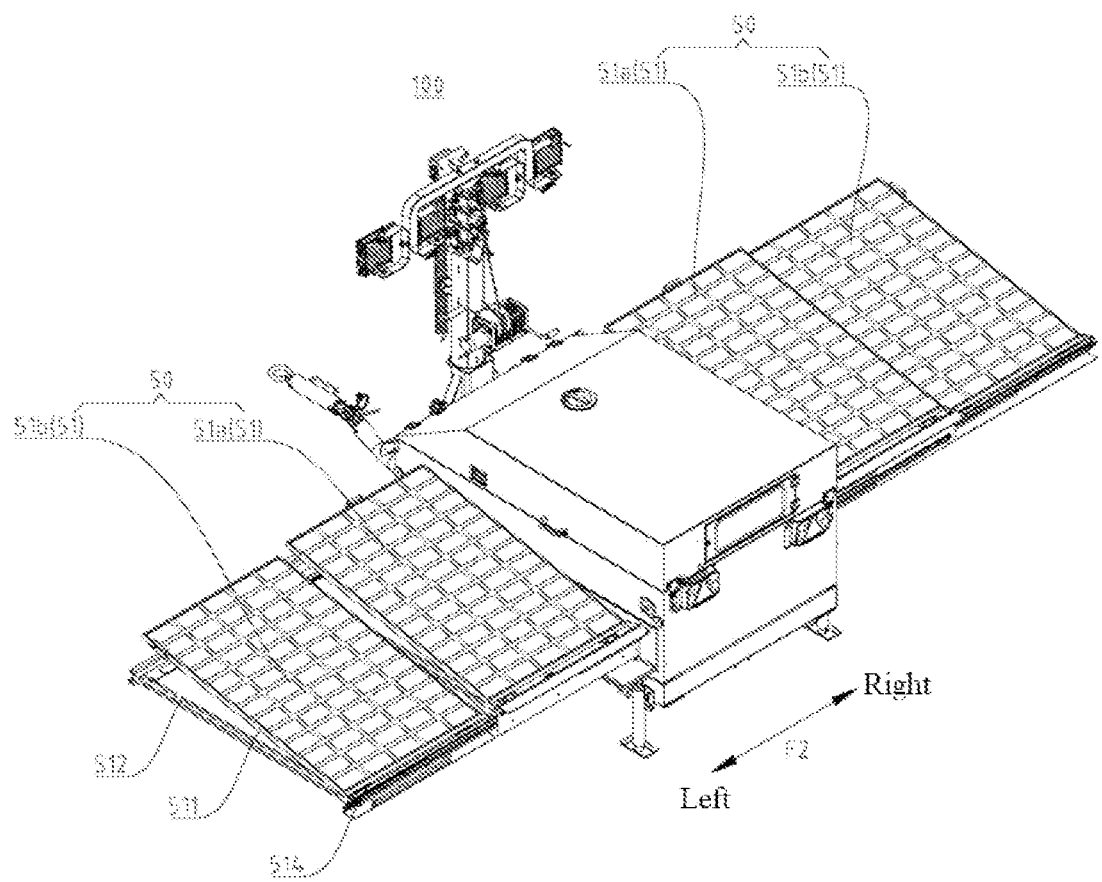
FIG. 4 is a schematic diagram of a lighthouse in a state according to an embodiment of the present disclosure.
Figure 5:
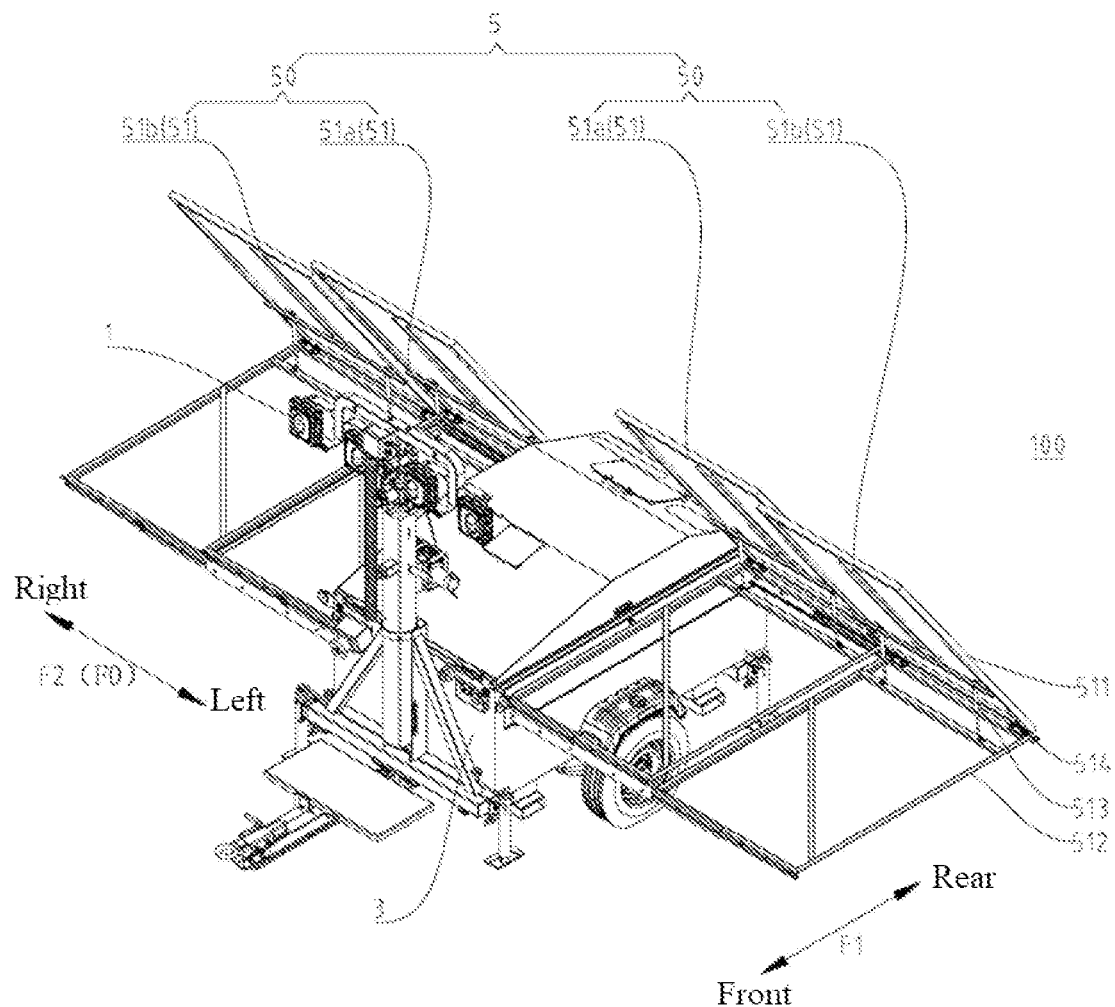
FIG. 5 is a schematic diagram of a lighthouse in a state according to an embodiment of the present disclosure.

As shown in FIGS. 4 and 5, each stage unfolding mechanism 51 includes a sliding frame 512, and the solar panel 511 is arranged on the sliding frame 512 to slide following the sliding frame 512 along a preset direction F0, that is, two adjacent stage unfolding mechanisms 51 (such as the first stage unfolding mechanism 51a and the second stage unfolding mechanism 51b) can realize relative sliding between the two adjacent stage unfolding mechanisms 51 along the preset direction F0 through the direct or indirect cooperation between the sliding frames 512. The initial stage unfolding mechanism 51 (such as the first stage unfolding mechanism 51a) can realize the relative sliding along the preset direction F0 through the direct or indirect cooperation between the sliding frame 512 and the box body 3, and the relative sliding of the two adjacent stage unfolding mechanisms 51 along the preset direction F0. Therefore, by providing the sliding frame 512, a sliding rail structure for sliding can be processed on the sliding frame 512, so that the sliding of the solar panel 511 can be simply and effectively realized without modifying the solar panel 511, reducing the processing difficulty of the solar panel 511.

The sliding frame 512 can be an industrial-grade sliding rail with a locking function, so that when the solar unit 50 is in an extreme unfolded state or receiving state, that is, in an extreme retracted position or extreme extended position, it can be locked by a locking mechanism on the sliding frame 512 to prevent the sliding frame 512 from moving and improve the reliability of use and receiving. It should be noted that the specific structure of the locking mechanism for realizing the relative locking of the sliding frame 512 can be varied, which is not limited and repeated here.

In some embodiments, as shown in FIGS. 1 and 4, in the extreme unfolded state, the solar panels 511 of any two stage unfolding mechanisms 51 do not overlap at all, that is, no overlap is present between the solar panels 511 of any two stage unfolding mechanisms 51. That is, in the extreme unfolded state, no any up-and-down stacking relationship is present between parts of any two solar panels 511, so that a solar energy absorption rate of the solar unit 50 can be further improved. Of course, the present disclosure is not limited to this. In some embodiments, in the extreme unfolded state, the solar panels 511 of any two stage unfolding mechanisms 51 partially overlap, that is, in the extreme unfolded state, a partial up-and-down stacking relationship is present between any two solar panels 511, so that the connection reliability and structural compactness of the solar unit 50 can be improved, and materials can be saved to a certain extent. In addition, it should be noted that the "extreme unfolded state" mentioned herein refers to a state where centers of solar panels 511 of two adjacent stage unfolding mechanisms 51 are the farthest away from each other.

As shown in FIG. 5, each stage unfolding mechanism 51 further includes a pusher 513, the solar panel 511 is pivotally connected to the sliding frame 512, and two ends of the pusher 513 are pivotally connected to the sliding frame 512 and the solar panel 511, respectively, to push the solar panel 511 to rotate relative to the sliding frame 512. Therefore, after the unfolding mechanism 51 is unfolded, the solar panel 511 can be driven by the pusher 513 to rotate around the frame hinge 514, so that the solar panel 511 can be rotated to an optimal angular position according to the actual situation, such as the location and time of use and the orientation of the sun, to absorb solar energy to a greater extent. It should be noted that the specific structure of the pusher 513 is not limited. For example, the pusher 513 can be a pneumatic cylinder, hydraulic cylinder, or electric cylinder with a locking function, etc., so as to ensure that the solar panel 511 rotates and stops at the current position.

In addition, two ends of the pusher 513 can be pivotally connected to the solar panel 511 and the sliding frame 512, respectively, so that when the pusher 513 drives the solar panel 511 to rotate, the pusher 513 also rotates. In this way, when the solar panel 511 rotates by a rotation angle of zero degrees to be laid flat on the sliding frame 512, the pusher 513 can also be laid flat, so that the thickness of the unfolding mechanism 51 is more compact, and the vertical space occupied when the multiple unfolding mechanisms 51 are stacked up on each other can be reduced.

In some embodiments, the box body 3 has the drawing port provided on two sides thereof, the solar module 5 includes two solar units 50, and the two solar units 50 can be drawn out through the drawing ports on the two sides in opposite directions. Therefore, the space can be more fully utilized, more solar units 50 can be arranged in the solar device 10, and the efficiency of converting solar energy into electric energy can be improved. When the two solar units 50 are both received in the receiving chamber, the two solar units 50 are stacked up on each other, that is, one solar unit 50 is stacked above or below the other solar unit 50, so that the vertical space can be fully utilized when the solar units are received, and the horizontal space required for receiving can be reduced on the premise that the area of each solar unit 50 is sufficient.

In some embodiments, as shown in FIG. 2, the box body 3 includes a cover plate 31 which is disposed at the drawing port and are openable there, so that when the solar module 5 is received back into the drawing chamber, the cover plate 31 can be used to close the drawing port, so as to further protect the solar module 5 and avoid the problems of water and dust entering from the drawing port. It should be noted that the connection manner of the cover plate 31 and the side wall of the box body 3 is not limited, for example, they may be hinged or slidably connected, etc. For example, in the example shown in FIG. 2, the cover plate 31 may be connected to a bottom edge of the drawing port through a cover plate hinge 32. The cover plate 31 is rotated downwards to open the cover plate 31, the cover plate 31 will not occupy other space, it is ensured that the drawing port can be effectively opened, and the cover plate 31 can be opened downwards by gravity, and the operation can be more labor-saving. In addition, the cover plate 31 can also have a handle, a lock insert and other devices provided thereon, so that the handle can be used to facilitate the opening of the cover plate 31, the cover plate 31 can be locked in the closed position by a lock insert, and the cover plate 31 can be opened by unlocking the lock insert.

In some embodiments, as shown in FIG. 2, the box body 3 includes a cover plate 31, which is disposed at the drawing port and are openable there, so that when the solar module 5 is received back into the drawing chamber, the cover plate 31 can be used to close the drawing port, so as to further protect the solar module 5 and avoid the problems of water and dust entering from the drawing port. It should be noted that the connection manner of the cover plate 31 and the side wall of the box body 3 is not limited, for example, they may be hinged or slidably connected, etc. For example, in the example shown in FIG. 2, the cover plate 31 may be connected to the bottom edge of the drawing port through a cover plate hinge 32. The cover plate 31 is rotated downwards to open the cover plate 31, the cover plate 31 will not occupy other space, it is ensured that the drawing port can be effectively opened, the cover plate 31 can be opened downwards by gravity, and the operation can be more labor-saving. In addition, the cover plate 31 can also has a handle, a lock insert and other devices provided thereon, so that the handle can be used to facilitate the opening of the cover plate 31, the cover plate 31 can be locked in the closed position by the lock insert, and the cover plate 31 can be opened by unlocking the lock insert.

Figure 3:
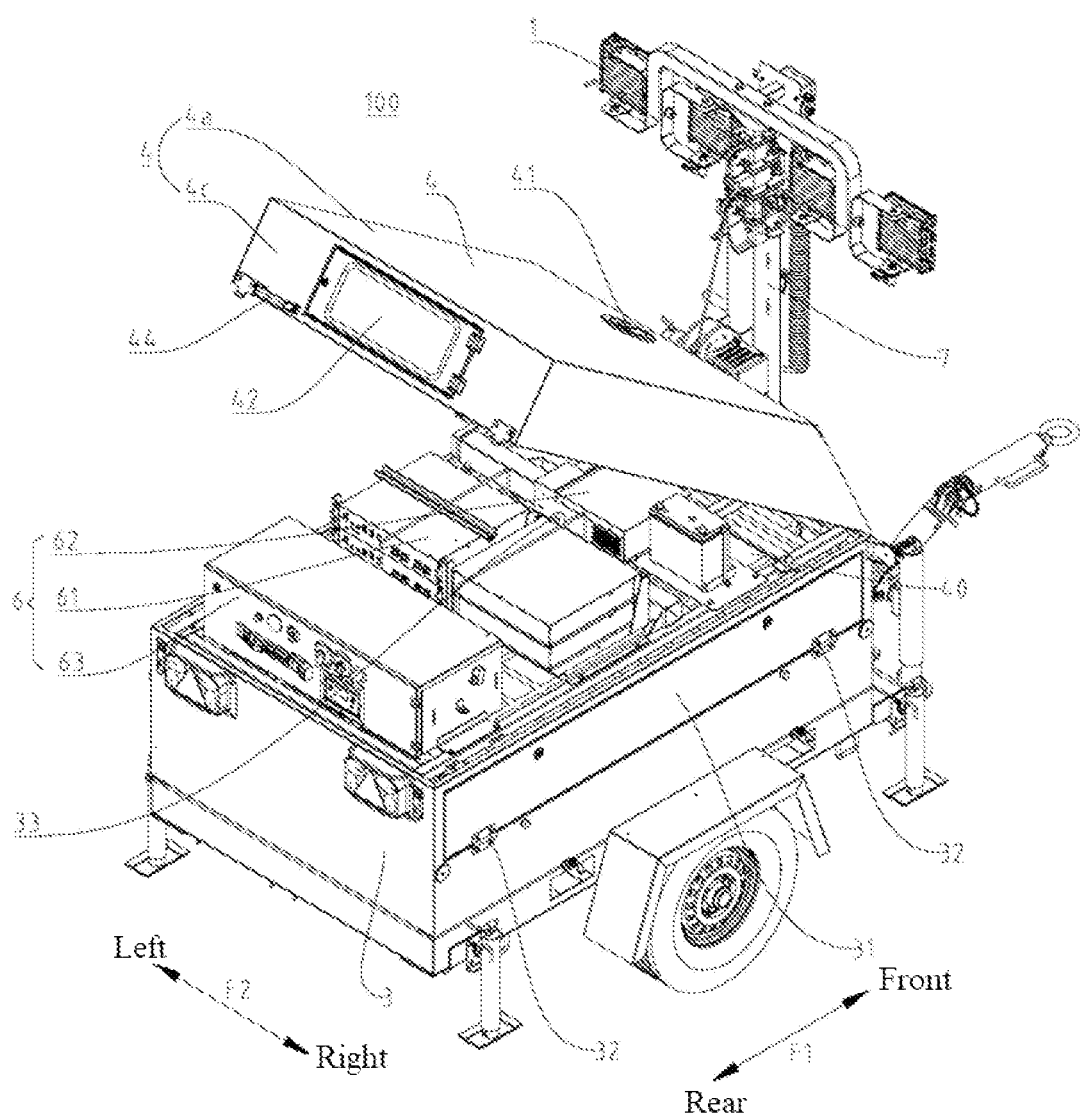
FIG. 3 is a schematic diagram of a lighthouse in a state according to an embodiment of the present disclosure.

In some embodiments, as shown in FIGS. 2 and 3, the top cover 4 is pivotally connected to the box body 3 so as to be rotatable between an open position in which the receiving chamber is opened and a closed position in which the receiving chamber is closed, that is, the top cover 4 and the box body 3 are pivotally connected by a top cover hinge 45, so that the top cover 4 can be rotated to open or close the top cover 4. Therefore, when the top cover 4 is opened, the top cover 4 is still connected to the box body 3, so the process of removing the top cover 4 from the box body 3 and reinstalling the top cover 4 back onto the box body 3 can be omitted, which further simplifies the operation.

Of course, the present disclosure is not limited to this. The top cover 4 and the box body 3 can also be movably connected in other ways. As long as it is convenient for the opening of the top cover 4, and the top cover 4 is not fixedly connected with the box body 3 in a non-detachable manner, it belongs to the scope of the movable connection. In some embodiments, the top cover 4 is slidably connected to the box body 3 so as to be slidable between an open position in which the receiving chamber is opened and a closed position in which the receiving chamber is closed. Thus, it is convenient to operate. It should be noted that the top cover 4 may be an integral top cover, or may be composed of multiple sub-covers. In a specific example, the top cover 4 may include two sub-covers, and each of the two sub-covers is slidably connected to the box body 3. The two sub-covers move towards each other to close the receiving chamber, and the two sub-covers move away from each other to open the receiving chamber, thereby reducing the driving force for driving each sub-cover to slide.

In some embodiments, as shown in FIGS. 2 and 3, when the top cover 4 is pivotally connected to the box body 3, the lighting device 1 is located on a side of the box body 3 in a first direction F1 (for example, the front side shown in the figure), and a top edge of the box body 3 on a side close to the lighting device 1 in the first direction F1 (for example, the top edge of the front side of the box body 3 shown in the figure) is pivotally connected to the top cover 4. As a result, the top cover 4 can be conveniently opened and closed, and the user can perform related operations on the side of the box body 3 away from the lighting device 1 (for example, the rear side shown in the figure), so that the user has more standing and operating space.

Figure 7:
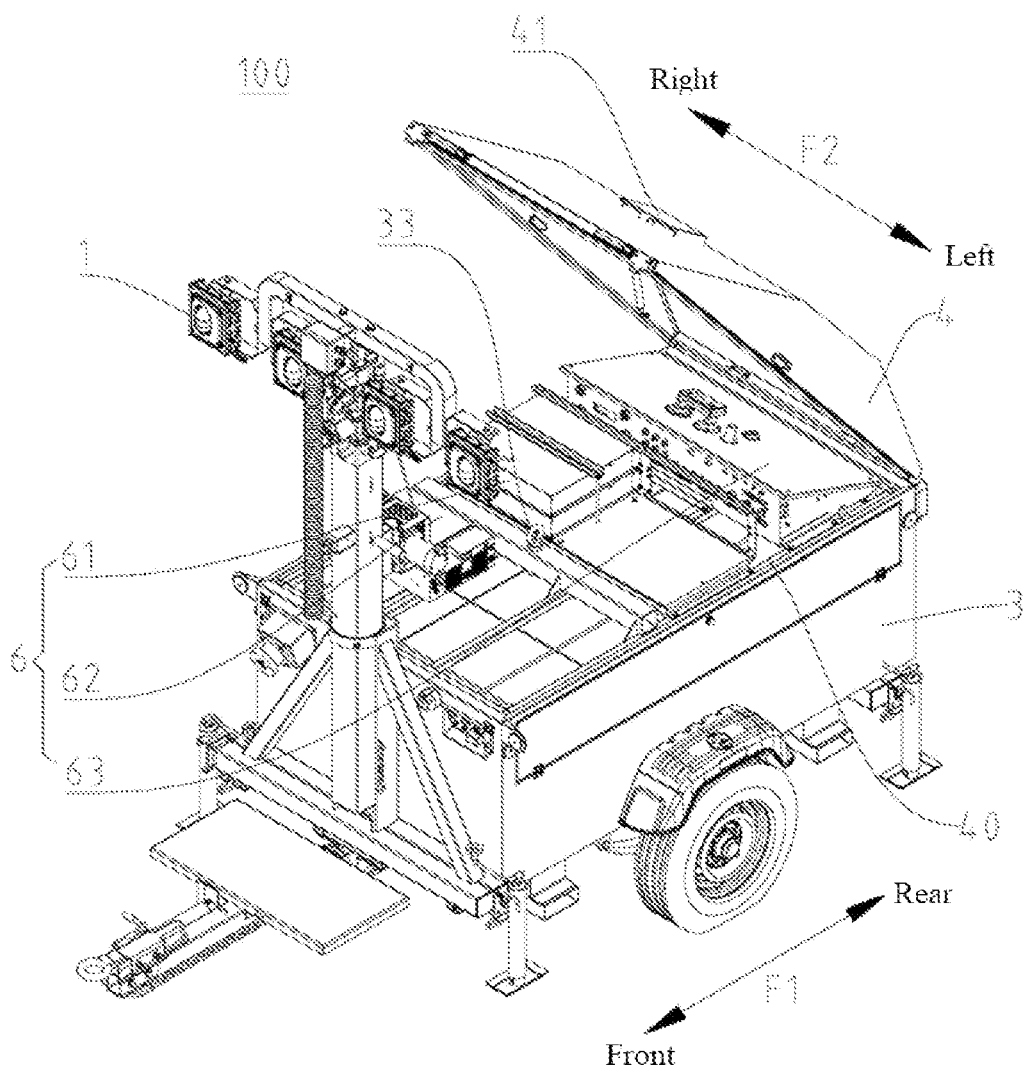
FIG. 7 is a schematic diagram of a lighthouse in a state according to an embodiment of the present disclosure.

Or, in other embodiments, as shown in FIG. 7, when the top cover 4 is pivotally connected to the box body 3, the lighting device 1 is located on a side of the box body 3 in the first direction F1 (the front side shown in the figure), and a top edge of the box body 3 on a side away from the lighting device 1 in the first direction F1 (for example, the top edge of the rear side of the box body 3 shown in the figure) is pivotally connected to the top cover 4. Therefore, the set position of the lighting device 1 will not affect an opening angle of the top cover 4, so as to ensure that the opening angle of the top cover 4 can meet the maintenance requirements, and the top cover 4 is prevented from hitting the lighting device 1 during the opening of the top cover 4. Further, on the premise that the opening angle of the top cover 4 meets the requirements, the size of the top cover 4 is increased as much as possible to provide larger open space after the top cover 4 is opened, which is convenient for maintenance.

In addition, in the above two connection modes, opening the top cover 4 does not affect the drawing operation of the solar module 5, that is, whether the solar module 5 is in the received state or drawn-out state, the top cover 4 can be opened for maintenance, which makes the overhaul and maintenance operations more flexible. Of course, the present disclosure is not limited to this. In other embodiments of the present disclosure, the top cover 4 can alternatively be set to be pivotally connected (not shown in the figure) to one of the top edges of the box body 3 in a second direction F2 (for example, the left side top edge or the right side top edge of the box body 3 shown in the figure), where the second direction F2 is perpendicular to the first direction F1.

In some embodiments, the top cover 4 has a handle provided thereon to facilitate the operations of opening and closing the top cover 4. It should be noted that the handle may be in the form of a groove, or in the form of a protruding handle loop, etc. There is no limitation here.

For example, in some specific examples, as shown in FIG. 3, the top cover 4 has a first handle 43 on a surface of at least one of the two sides in the second direction F2 perpendicular to the first direction F1 (for example, side surface 4b on the left and/or right side shown in the figure), so that whether "the top edge of the box body 3 on the side close to the lighting device 1 in the first direction F1 is pivotally connected to the top cover 4" or "the top edge of the box body 3 on the side away from the lighting device 1 in the first direction F1 is pivotally connected to the top cover 4", the first handle 43 can be used to realize the operations of opening and closing the top cover 4.

For example, in some specific examples, as shown in FIG. 4, the top cover 4 has a second handle 44 on the surface on the side away from the lighting device 1 in the first direction F1 (for example, the rear surface 4c shown in the figure). Therefore, when "the top edge of the box body 3 on the side close to the lighting device 1 in the first direction F1 is pivotally connected to the top cover 4", the second handle 44 can also be used to realize the operations of opening and closing the top cover 4.

For example, in a specific example, the top edge of the box body 3 on the side close to the lighting device 1 in the first direction F1 is pivotally connected to the top cover 4, the top cover 4 has a first handle 43 on at least one side of the two sides in the second direction F2 perpendicular to the first direction F1, and the top cover 4 has a second handle 44 on the side away from the lighting device 1 in the first direction Fl. The second handle 44 can be used to open the top cover 4, and the operation is more labor-saving. Since the second handle 44 on the top cover 4 in an open state is higher than the first handle 43 on the top cover 4 in the open state, then when the top cover 4 needs to be closed, the lower first handle 43 can be used to close the top cover 4, thereby facilitating operation.

Of course, the present disclosure is not limited to this. A top surface 4a of the top cover 4, or a surface of the top cover 4 on the side close to the lighting device 1 in the first direction F1, or other positions can also have a handle provided there, so as to meet different actual requirements, description of which will not be repeated here.

In addition, it should be noted that the pivotally connected top cover 4 described above may be, but is not limited to, an integral top cover this. In other examples, the pivotally connected top cover 4 may alternatively be composed of multiple sub-covers. In a specific example, the top cover 4 may include two sub-covers which are pivotally connected to the two sides of the box body 3 in the second direction F2, respectively, etc., description of which will not be repeated here.

In some embodiments, as shown in FIG. 3, when the built-in assembly 6 includes an electric control device 63, the top cover 4 may include a window 42 or a first openable door disposed oppositely to a local part of the electric control device 63. Therefore, the electric control device 63 can be observed and monitored through the window 42, or when an operation is required, the first openable door is opened, so that the user can touch the electric control device 63 under the top cover 4.

Figure 6:
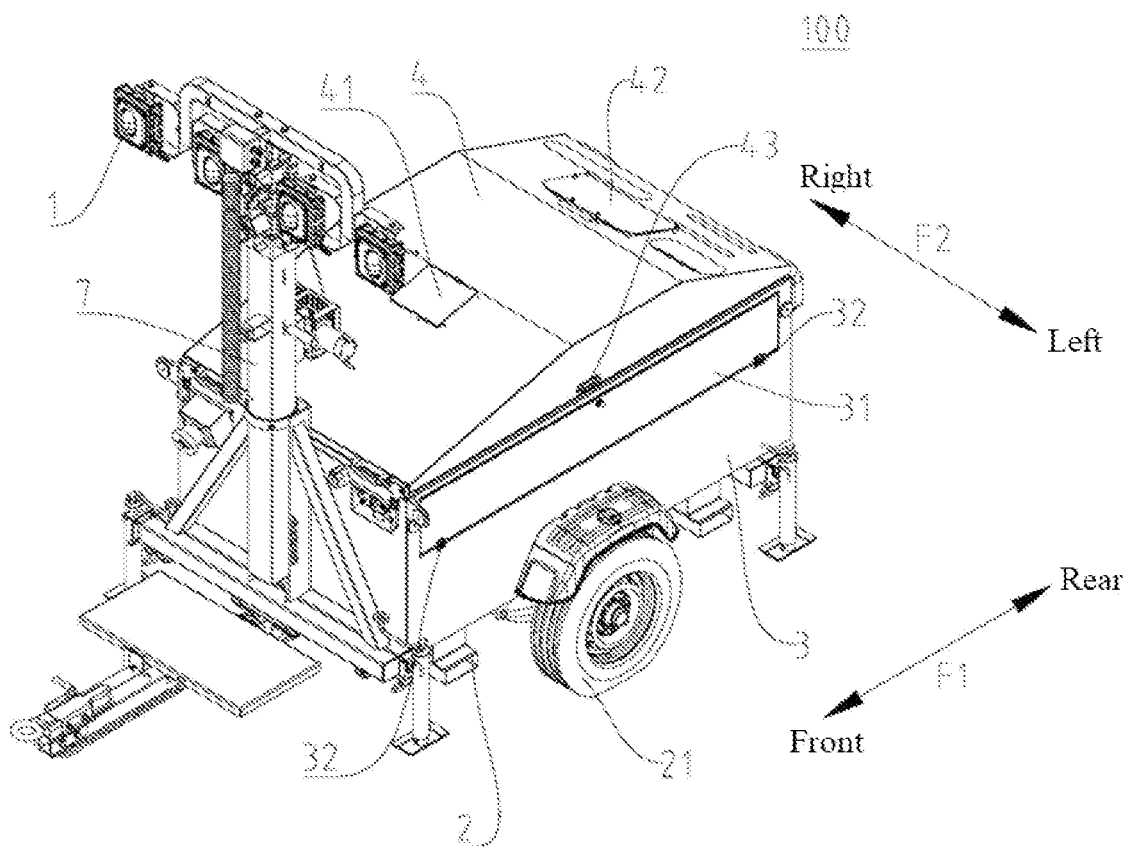
FIG. 6 is a schematic diagram of a lighthouse in a state according to an embodiment of the present disclosure.

It should be noted that the specific structure and shape of the electric control device 63 according to the embodiment of the present disclosure is not limited. In some embodiments, as shown in FIGS. 6 and 7, two side surfaces of the electric control device 63 in the second direction F2 (for example, the left side surface and the right side surface shown in the figure) may be triangular, and a top surface of the electric control device 63 can be substantially an inclined surface and extends obliquely downwards in a direction away from the lighting device 1 (the front-to-rear direction as shown in the figure). The inclined top surface of the electric control device 63 has a visual part (such as a screen, a console, etc.). In this case, a position on the top surface of the top cover 4 opposite to the top surface of the electric control device 63 can also be set as: an inclined surface extending downwards in a direction away from the lighting device 1 (the front-to-rear direction as shown in the figure) for setting the window 42 or the first openable door opposite to the visual part.

In some embodiments, as shown in FIGS. 2 and 3, the two side surfaces (for example, the left side surface and the right side surface shown in the figure) of the electric control device 63 in the second direction F2 may be rectangular, the top surface of the electric control device 63 may be substantially a flat surface, and a surface of the electric control device 63 on a side away from the lighting device 1 (for example, the rear surface shown in the figure) is a vertical rectangular surface and may has a visual part (such as a screen, a console, etc.). In this case, a position on the top surface 4a of the top cover 4 opposite to the top surface of the electric control device 63 can also be set to a flat surface, and a surface of the top cover 4 on the side away from the lighting device 1 (for example, the rear surface 4c of the top cover 4 shown in the figure) opposite to the rear surface of the electric control device 63 can also be a vertical rectangular surface, and is located at a side of the rear surface of the electric control device 63 away from the lighting device 1 (for example, the rear side shown in the figure), for setting the window 42 or the first openable door opposite to the visual part.

In some embodiments, as shown in FIGS. 2 and 3, the box body 3 has a lifting ring 33 provided therein, and the top cover 4 includes a second openable door 41 disposed oppositely to the lifting ring 33. Therefore, the lifting ring 33 can be exposed by opening the second openable door 41. In this way, the lighthouse 100 can be lifted to a vehicle or an installation platform by the cooperation of a lifting machine and the lifting ring 33 so as to realize transportation or use. It should be noted that the opening manners of the first openable door and the second openable door 41 are not limited. For example, they can be in the form of a sliding cover, a flip cover, a screw cover, etc., which are not limited here.

In some embodiments of the present disclosure, as shown in FIG. 1, the lighting device 1 is located on one side of the box body 3 in the first direction F1, and the box body 3 has drawing ports provided on two sides thereof in the second direction F2 perpendicular to the first direction F1. The solar module 5 includes two solar units 50. The two solar units 50 can be drawn out from the drawing ports on the two sides, respectively. When the two solar units 50 are both received in the drawing chamber, the two solar units 50 are stacked up on each other. It should be noted that said "stacked up on each other" mentioned herein only refers to the arrangement in the up-and-down direction, and it does not require that among the two parts stacked up on each other, the upper part be in contact with the lower part, that is, the upper part may be in direct contact, indirect contact, or non-contact with the lower part.

Therefore, the drawing of the solar module 5 will not cause interference to the lighting device 1, and the setting of the lighting device 1 will not affect the drawing of the solar module 5. In addition, when the solar module 5 needs to be used, the two solar units 50 can be drawn towards two opposite sides along the second direction F2, thereby increasing the area of the solar units 50 that can receive solar energy and improving the solar energy absorption efficiency of the solar module 5.

In addition, when the solar module 5 is not needed, the two solar units 50 can be pushed towards the center along the second direction F2 to retract the two solar units 50 into the drawing chamber. Since the two solar units 50 are stacked up on each other when they are retracted into the drawing chamber, which ensures the space utilization rate in the box body 3 is higher, the drawing chamber has a reduced size on the premise of ensuring that each solar unit 50 has a larger area, and the structure of the box body 3 can be compact and occupy a smaller space. In other words, each solar unit 50 can has an increased solar energy absorption area on the premise of ensuring that the structure of the box body 3 is compact.

Each solar unit 50 includes two stages of unfolding mechanisms 51, i.e., a first stage unfolding mechanism 51a and a second stage unfolding mechanism 51b. Each stage unfolding mechanism 51 includes a solar panel 511, a sliding frame 512, and a pusher 513. A side of the solar panel 511 away from the lighting device 1 in the first direction F1 is pivotally connected to the sliding frame 512, and the solar panel 511 and the sliding frame 512 slide synchronously in the second direction F2. Two ends of the pusher 513 are pivotally connected with the solar panel 511 and the sliding frame 512, respectively, to push the solar panel 511 to rotate relative to the sliding frame 512. The sliding frame 512 of the first stage unfolding mechanism 51a adopts a sliding fit with the box body 3 so that the first stage unfolding mechanism 51a can be slidably unfolded relative to the box body 3 along the second direction F2, and the sliding frame 512 of the second stage unfolding mechanism 51b adopts a sliding fit with the sliding frame 512 of the first stage unfolding mechanism 51a so that the second stage unfolding mechanism 51b is slidably unfolded relative to the first stage unfolding mechanism 51a along the second direction F2.

In some embodiments of the present disclosure, in conjunction with FIG. 2, the lighthouse 100 further includes a carrier 2 with wheels 21 thereon to be able to support the carrier 2 to move on a running surface, and the box body 3 is arranged on the carrier 2 so that the carrier 2 can move to drive the box body 3 to move together to realize the mobile work of the lighthouse 100.

In the description of this specification, descriptions with reference to the terms "an embodiment", "some embodiments", "examples", "specific examples", or "some examples" etc.

mean that specific features, structures, materials or characteristics described in conjunction with the embodiment or example are included in at least one embodiment or example of the present disclosure. In this specification, the schematic representations of the above terms do not necessarily refer to the same embodiment or example. In addition, the described specific features, structures, materials or characteristics may be combined in any one or more embodiments or examples in a suitable manner. In addition, those skilled in the art can combine the different embodiments or examples and the features of the different embodiments or examples described in this specification without contradicting each other.

Although the embodiments of the present disclosure have been shown and described, those of ordinary skill in the art can understand that various changes, modifications, substitutions, and variations can be made to these embodiment without departing from the principle and purpose of the present disclosure. The scope of the present disclosure is defined by the claims and equivalents thereof.

What is claimed is:

1. A lighthouse comprising a mast device and a lighting device mounted on the mast device, wherein the lighthouse further comprises:
a main body comprising a box body and a top cover, wherein the top cover is arranged on a top of the box body, the top cover and the box body define a receiving chamber, and the top cover is movable or detachable relative to the box body to open or close the receiving chamber,
wherein the power supply assembly comprises a solar module, and
wherein the box body has a drawing port provided in a side wall thereof, the drawing port being in communication with the receiving chamber, and the solar module is movable between a position in which the solar module is received in the receiving chamber and a position in which the solar module is drawn out of the receiving chamber through the drawing port.

2. The lighthouse according to claim 1, further comprising:
a built-in assembly arranged in the receiving chamber and electrically connected to the lighting device; and
a power supply assembly arranged in the receiving chamber and electrically connected to the built-in assembly to provide electrical energy to the lighting device.

3. The lighthouse according to claim 2, wherein the receiving chamber comprises an upper receiving chamber and a lower receiving chamber, the upper receiving chamber is located above the lower receiving chamber, the power supply assembly is received in the upper receiving chamber, the upper receiving chamber is opened to expose the power supply assembly when the top cover opens the receiving chamber, and the built-in assembly is received in the lower receiving chamber.

4. The lighthouse according to claim 3, wherein the box body is further provided with a side openable door, and the side openable door corresponds to the built-in assembly and is provided on a side surface of the box body.

5. The lighthouse according to claim 2, wherein the receiving chamber comprises an upper receiving chamber and a lower receiving chamber, the upper receiving chamber is located above the lower receiving chamber, the built-in assembly is received in the upper receiving chamber, the upper receiving chamber is opened to expose the built-in assembly when the top cover opens the receiving chamber, and the power supply assembly is received in the lower receiving chamber.

6. The lighthouse according to claim 1, wherein the solar module comprises at least one solar unit, each solar unit comprises at least one stage unfolding mechanism, and each stage unfolding mechanism comprises a solar panel.

7. The lighthouse according to claim 6, wherein each stage unfolding mechanism further comprises a sliding frame and a pusher, the solar panel is connected to the sliding frame to slide following the sliding frame to be unfolded, the solar panel is pivotally connected to the sliding frame, and two ends of the pusher are pivotally connected to the sliding frame and the solar panel, respectively, to push the solar panel to rotate relative to the sliding frame.

8. The lighthouse according to claim 6, wherein the box body has the drawing port provided on two sides thereof, the solar module comprises two solar units, the two solar units are drawable out in opposite directions through the drawing ports on the two sides, respectively, and when the two solar units are both received in the receiving chamber, the two solar units are stacked up.

9. The lighthouse according to claim 1, wherein the top cover is pivotally connected to the box body so as to be rotatable between an open position in which the receiving chamber is opened and a closed position in which the receiving chamber is closed.

10. The lighthouse according to claim 9, wherein the lighting device is located on a side of the box body in a first direction, and a top edge of the box body on a side close to or away from the lighting device in the first direction is pivotally connected to the top cover.

11. The lighthouse according to claim 1, wherein the top cover is slidably connected to the box body so as to be slidable between an open position in which the receiving chamber is opened and a closed position in which the receiving chamber is closed.

12. The lighthouse according to claim 11, wherein the top cover comprises two sub-covers, each of the two sub-covers is slidably connected to the box body, the two sub-covers move towards each other to close the receiving chamber, and the two sub-covers move away from each other to open the receiving chamber.

13. The lighthouse according to claim 1, wherein the built-in assembly comprises a charging and discharging device and a battery, the solar module is electrically connected to the charging and discharging device, the charging and discharging device is electrically connected to the battery, and the battery is electrically connected to the lighting device.

14. The lighthouse according to claim 13, wherein the power supply assembly further comprises: an oil tank, an engine and an electricity generator, the oil tank is connected to the engine to supply oil to the engine, the engine is connected to the electricity generator to drive the electricity generator to generate electricity, and the electricity generator is electrically connected to the charging and discharging device, wherein the solar module is located above the oil tank, the engine, and the electricity generator.

15. The lighthouse according to claim 1, wherein the top cover has a handle provided thereon.

16. The lighthouse according to claim 1, wherein the built-in assembly comprises an electric control device, the top cover comprises a window or a first openable door arranged oppositely to a part of the electric control device, and/or, the box body has a lifting ring provided therein, and the top cover comprises a second openable door arranged oppositely to the lifting ring.

17. The lighthouse according to claim 1, wherein the power supply assembly comprises: an oil tank, an engine and an electricity generator, the oil tank is connected to the engine to supply oil to the engine, the engine is connected to the electricity generator to drive the electricity generator to generate electricity, the built-in assembly comprises a charging and discharging device and a battery, the electricity generator is electrically connected to the charging and discharging device, the charging and discharging device is electrically connected to the battery, and the battery is electrically connected to the lighting device.

* * * * *